United States Patent
Bergelin et al.

(10) Patent No.: US 9,897,462 B2
(45) Date of Patent: Feb. 20, 2018

(54) FLAP ANGLE MEASUREMENT SYSTEM AND METHOD

(71) Applicant: UMS Skeldar Sweden AB, Linköping (SE)

(72) Inventors: Magnus Bergelin, Linköping (SE); Kristian Erlandsson, Skärblacka (SE)

(73) Assignee: UMS Skeldar Sweden AB, Linköping (SE)

( * ) Notice: Subject to any disclaimer, the term of this patent is extended or adjusted under 35 U.S.C. 154(b) by 0 days.

(21) Appl. No.: 15/028,574

(22) PCT Filed: Oct. 10, 2013

(86) PCT No.: PCT/SE2013/051192
§ 371 (c)(1),
(2) Date: Apr. 11, 2016

(87) PCT Pub. No.: WO2015/053671
PCT Pub. Date: Apr. 16, 2015

(65) Prior Publication Data
US 2016/0282140 A1    Sep. 29, 2016

(51) Int. Cl.
| | | |
|---|---|---|
| *G01D 5/12* | (2006.01) | |
| *G07C 5/08* | (2006.01) | |
| *B64C 27/39* | (2006.01) | |
| *B64C 27/00* | (2006.01) | |
| *B64D 45/00* | (2006.01) | |

(52) U.S. Cl.
CPC ............ *G01D 5/12* (2013.01); *B64C 27/008* (2013.01); *B64C 27/39* (2013.01); *G07C 5/0808* (2013.01); *B64D 2045/0085* (2013.01)

(58) Field of Classification Search
CPC ........ G01D 5/12; B64C 27/39; G07C 5/0808; B64D 2045/0085
See application file for complete search history.

(56) References Cited

U.S. PATENT DOCUMENTS

| | | | | |
|---|---|---|---|---|
| 3,954,229 A | * | 5/1976 | Wilson | B64C 27/001 244/17.13 |
| 4,246,967 A | * | 1/1981 | Harris | E21B 33/05 15/104.062 |
| 4,519,743 A | * | 5/1985 | Ham | B64C 27/72 244/17.13 |
| 4,667,158 A | | 5/1987 | Redlich | |

(Continued)

FOREIGN PATENT DOCUMENTS

EP    0339983 A2    11/1989

OTHER PUBLICATIONS

Supplementary European Search Report dated May 10, 2017 in Patent Application No. EP 13 89 5430.

*Primary Examiner* — Redhwan K Mawari
*Assistant Examiner* — Rodney P King
(74) *Attorney, Agent, or Firm* — Venable LLP; Jeffri A. Kaminski

(57) ABSTRACT

A system for monitoring movements of rotor blades attached by flapping hinges to a central head or hub of a helicopter. At least one sensor is arranged to continuously measure vertical angular movement of a rotor blade and/or the flapping hinge. Also a method for monitoring movements of rotor blades attached by flapping hinges to a central head or hub of a helicopter.

12 Claims, 3 Drawing Sheets

(56) References Cited

U.S. PATENT DOCUMENTS

| | | | | |
|---|---|---|---|---|
| 6,415,206 B1 * | 7/2002 | Ventres | ............... | B64C 27/001 244/17.11 |
| 2004/0022619 A1 * | 2/2004 | Spatafora | ............... | B65H 3/322 414/796.9 |
| 2012/0257847 A1 | 10/2012 | Allred et al. | | |
| 2013/0243597 A1 * | 9/2013 | Perrin | ............... | B64C 27/008 416/131 |
| 2013/0327896 A1 * | 12/2013 | Mezan | ............... | G05D 1/0808 244/235 |

* cited by examiner

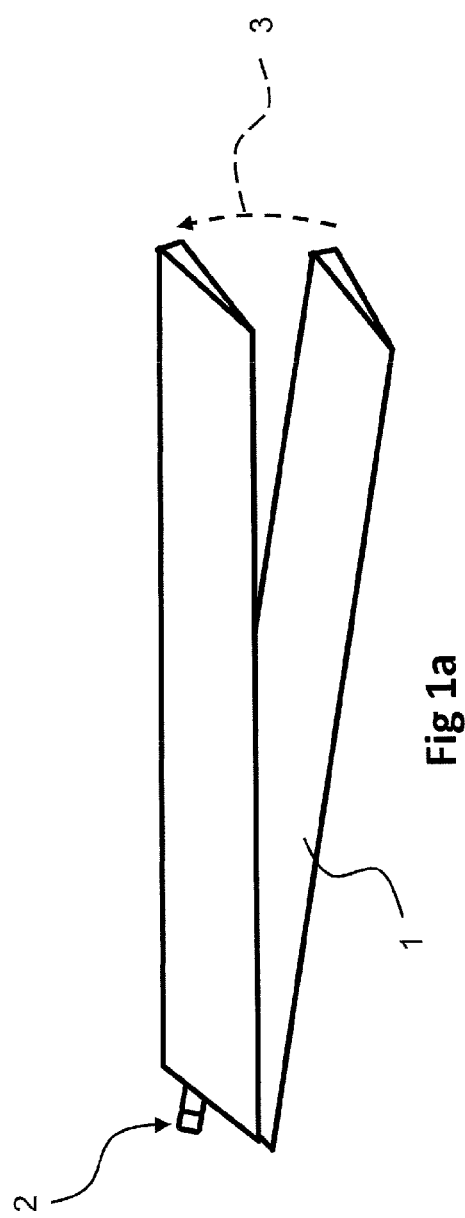
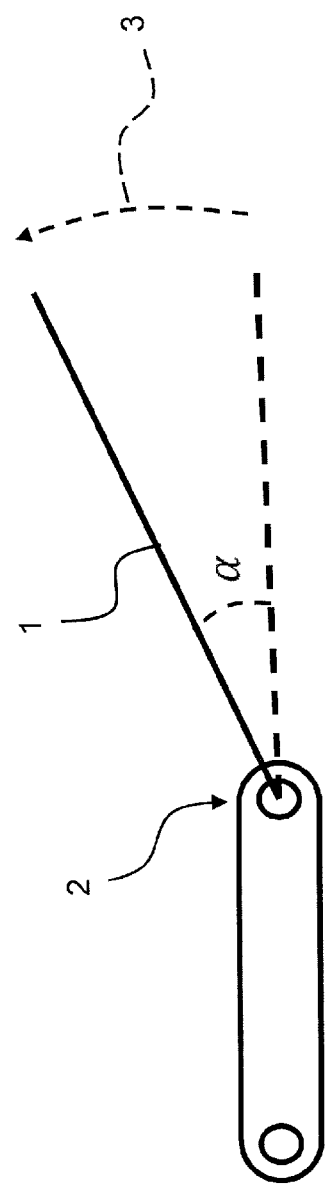

FLAP ANGLE MEASUREMENT SYSTEM AND METHOD

CROSS-REFERENCE TO RELATED APPLICATIONS

The application is the national phase under 35 U.S.C. § 371 of PCT/SE2013/051192 filed 10 Oct. 2013.

FIELD OF THE INVENTION

The invention relates in general to a system and a method for monitoring movements of the rotor blades attached by flapping hinges to a rotor head or hub of a helicopter, and where the flapping hinges permit vertical angular displacement of the blades relative to the rotor head/hub.

BACKGROUND ART

At helicopters a phenomenon is common that makes the rotor blades move up and down in their vertical direction, i.e. in the vertical direction in relation to the helicopter. This movement is called "flapping" and is an important factor in the helicopter's behavior in the air during flight. Seizing or malfunctioning flapping hinges can affect the helicopter's function and dynamics in a negative way, which may lead, in the worst case, to a sudden failure or breakdown.

It is therefore desirable to monitor e.g. at what pitch the rotor blades are "flapping". Monitoring the vital parts of a helicopter, for example the flapping hinges, may result in a less risk of a serious failure in the long run. It is also possible to get a better understanding of when maintenance is really necessary and when it is necessary to change vital parts in the helicopter. This may result in longer running time for expensive parts before they need to be replaced instead of having a fixed replacement interval, when fully functional parts are exchanged unnecessarily.

The present invention is based on the design of a device or a system including linear position transducers (LDT) by which it is possible to monitor and calculate when and how much the, for instance two, rotor blades are "flapping" upwards. A rotor blade is "flapping" with about the same frequency as the rotor speed, allowing the signal to come out from the system as a sine curve. The flapping frequency depends on the rotor configuration and some parameters for example the flapping hinge offset from the rotor center of rotation There have previously been several attempts to design systems for detecting the flapping angle α of the rotors in a helicopter.

U.S. Pat. No. 2,620,888 illustrates for example a system that indicates and corrects the unbalance in the lifting force of the rotors of a helicopter. The document describes a mechanism that detects differences in the flapping between the rotors, and then compensates the flapping behavior by means of a hydraulic system. This mechanism does not for instance include any electronic or linear sensors.

U.S. Pat. No. 2,936,836 illustrates a rotor blade tracking mechanism for lifting rotors of a helicopter and the purpose of the invention is to indicate and correct for lifting differences between the rotors in order to minimize undesirable vibrations. The document describes a system that detects unbalance in the flapping behavior between the rotors. This is based on that the angle between the rotors is changed and the system makes use of that the flapping hinges generate sinus wave formed motions.

Both these documents describe systems for compensating for differences in flapping and for the purpose of reducing vibration levels. The wear of a component is not monitored or detected in itself.

WO20120953325 describes a function-monitored guidance system, a high-lift system, with a monitoring device providing operating state determination function for determining overshoots of stored threshold values. The invention illustrates surveillance of components in order to discover wear, primarily at interceptor aircraft in which sensors measure the mechanical properties such as load states of a component like a flapper point or a bearing and compare these values with desired predetermined values. The sensors measures for example vibrations, acceleration or tension.

SUMMARY OF THE INVENTION

One object of the present invention is to solve the problems indicated above and to create a flap angle measurement system and a method that is effective, simple in its design and reliable to use and that measures the angular change of the flapping hinge for each rotor blade in the rotor head/hub of a helicopter. This and additional objects and advantages are achieved according to the invention with a system having the features described herein.

A further object is to provide a system including a new and efficient mechanical/electrical device, which effectively is able to monitor the angular change of the flapping hinge and generate an electrical signal related to the angular change.

A further object of the invention is that the system should be simple in its design and consist of as few parts as possible and thus be cost effective to manufacture and install.

A further object of the invention is that the system should be of low weight and compact in size.

A further object of the present invention is that the system should be easy to adjust/calibrate.

The invention relates, as indicated above, to a system and method for monitoring vertical movements of the rotor blades attached by flapping hinges to a central head/hub of a helicopter.

The invention is achieved by designing the system so that at least one sensor is arranged to continuously measure the vertical angular movement of a rotor blade and/or the flapping hinge.

By the inventive design the disadvantages of the prior art is eliminated, and a more practical, light weighted, functional and above all easily and safely system is achieved.

The simple design of the invention results in that at least one sensor is arranged to continuously measure the vertical angular movement of a rotor blade and/or the flapping hinge. The at least one sensor, one sensor per rotor blade, is arranged to generate an electrical signal that is a sine wave as long as all parts are functioning as expected. A control/evaluation unit is arranged to receive the electrical signal from the sensor and evaluate the signal for detecting any abnormalities. The control/evaluation unit may be arranged to compare the actual measured electrical signal to a stored signal or value in order to detect if the actual measured signal depart from the predetermined signal or from predetermined acceptable values, i.e. there is detected if the actual measured signal is distorted in any way, indicating that the flapping hinge is malfunctioning and/or needs maintenance.

This monitoring system/method can be used as a simple and effective tool during flight in an operational helicopter for constantly/continuously monitoring e.g. the wear of bearings and/or other components in the rotor head/hub. The system/device can also preferably be used as an effective tool for evaluation and checking of the condition of new rotor head/hub designs.

Further features and advantages of the invention will become apparent from the following more detailed description of the invention and the accompanying drawings and dependent claims.

BRIEF DESCRIPTION OF THE DRAWINGS

The invention is described below in some preferred embodiments, in the light of the following accompanying drawings.

FIG. 1a,b illustrates in principle the flapping movement that may occur of the rotor blades on a helicopter during flight.

DETAILED DESCRIPTION OF PREFERRED EMBODIMENTS

FIG. 1a,b illustrates in principle the flapping movement that may occur for a rotor blade 1 on a helicopter (not shown) during flight. The rotor blade 1 is moving/flapping around a flapping hinge 2, the movement is indicated by an arrow 3. The flapping comes from cyclic pitch command i.e. if the pilot wants to put the helicopter in forward flight for example. The flapping also comes from winds/gust. The allowance of blade flapping will reduce bending forces in the rotor blades and is a common design in helicopters.

Figure 2:
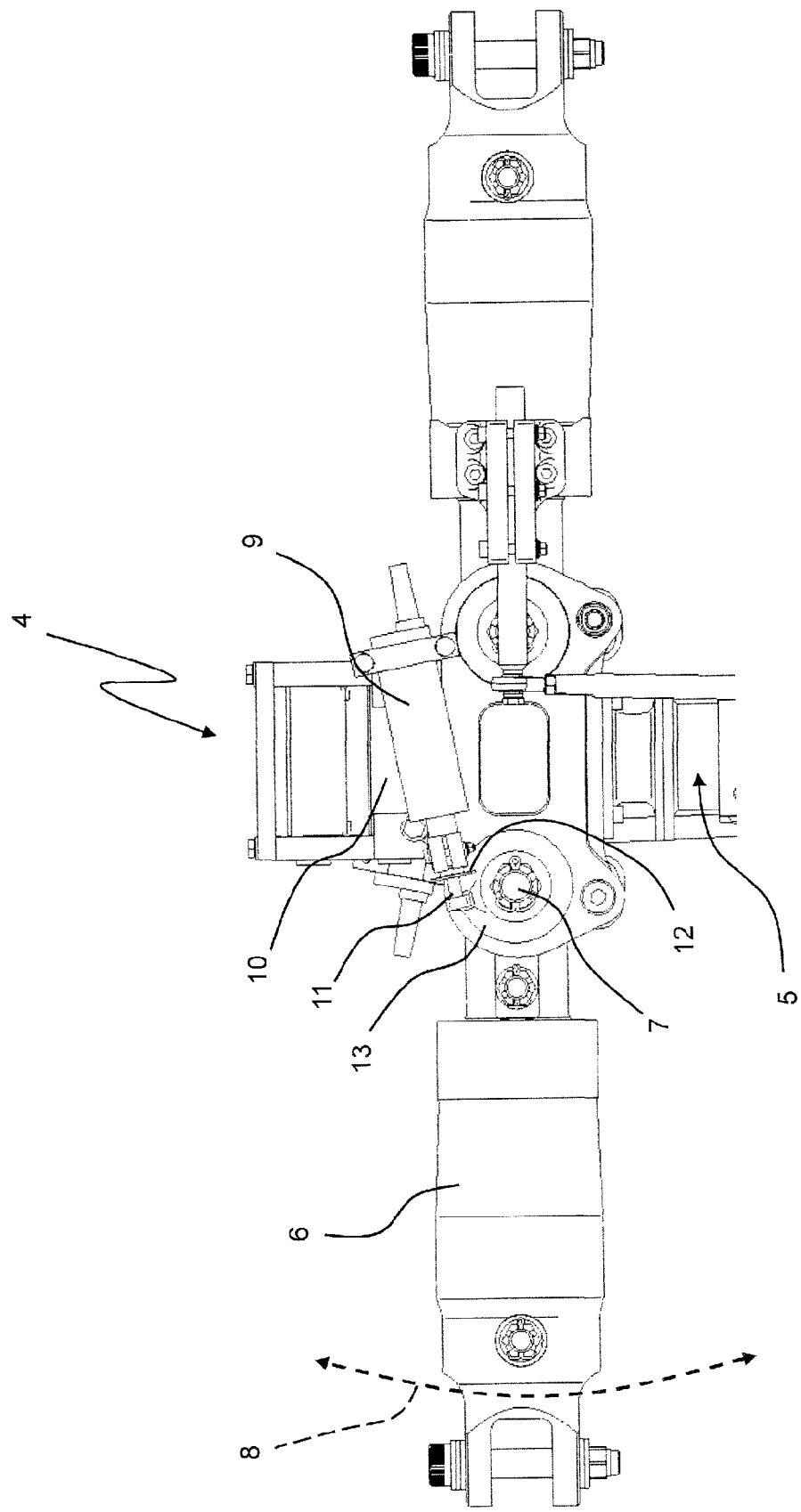
FIG. 2 illustrates from a side view a rotor head/hub mounted on a rotor shaft on a helicopter.

FIG. 2 illustrates from the side a rotor head/hub 4 located on the top of a helicopter rotor shaft 5. The head/hub 4 has a main body and connecting members projecting from the main body and for e.g. the connection of respective blade (not shown). The main body and the connecting members being defined by separate components connectable to one another by releasable fastening means like bolts for example. The helicopter may typically be of e.g. the type of VTOL ("Vertical Take Off and Landing") and/or UAV ("Unmanned Aerial Vehicle"). The rotor blades are normally mounted to the rotor shaft or head/hub via a rotor blade linkage 6. The flapping of the rotor blades is made possible by the means of flapping hinges 7 and the rotor blades are thereby able to partly rotate in their vertical directions, (as indicated by the arrow 8).

In the same figure at least one sensor 9, e.g. a linear position transducer or LDT, is installed near the top of the rotor shaft 5 and on the rotor head 4. The LDT is fixed to the rotor head 4 by screws/bolts and a console 10. The sensor arm or axle 11 of the LDT is adjustable by an adjustment mechanism 12, formed like a washer which is possible to adjust by screwing. The sensor axle 11 is in contact with a tilting washer 13 that rotates with the flapping hinge 7 together with the rotor blade when the rotor blade turns upwards or downwards. It is important that the axle 11 of the sensor 9, the linear position transducer, always is in mechanical contact with the tilting washer 13 and this adjustment could be made by the help of the adjustment mechanism 12. In the case that two rotor blades and two sensors 9 are used both sensors 9 may by calibrated to each other in order to give exactly the same response, the same electrical signals or the same signal values, at a given flapping angle $\alpha$ of the rotor blades.

Figure 3:
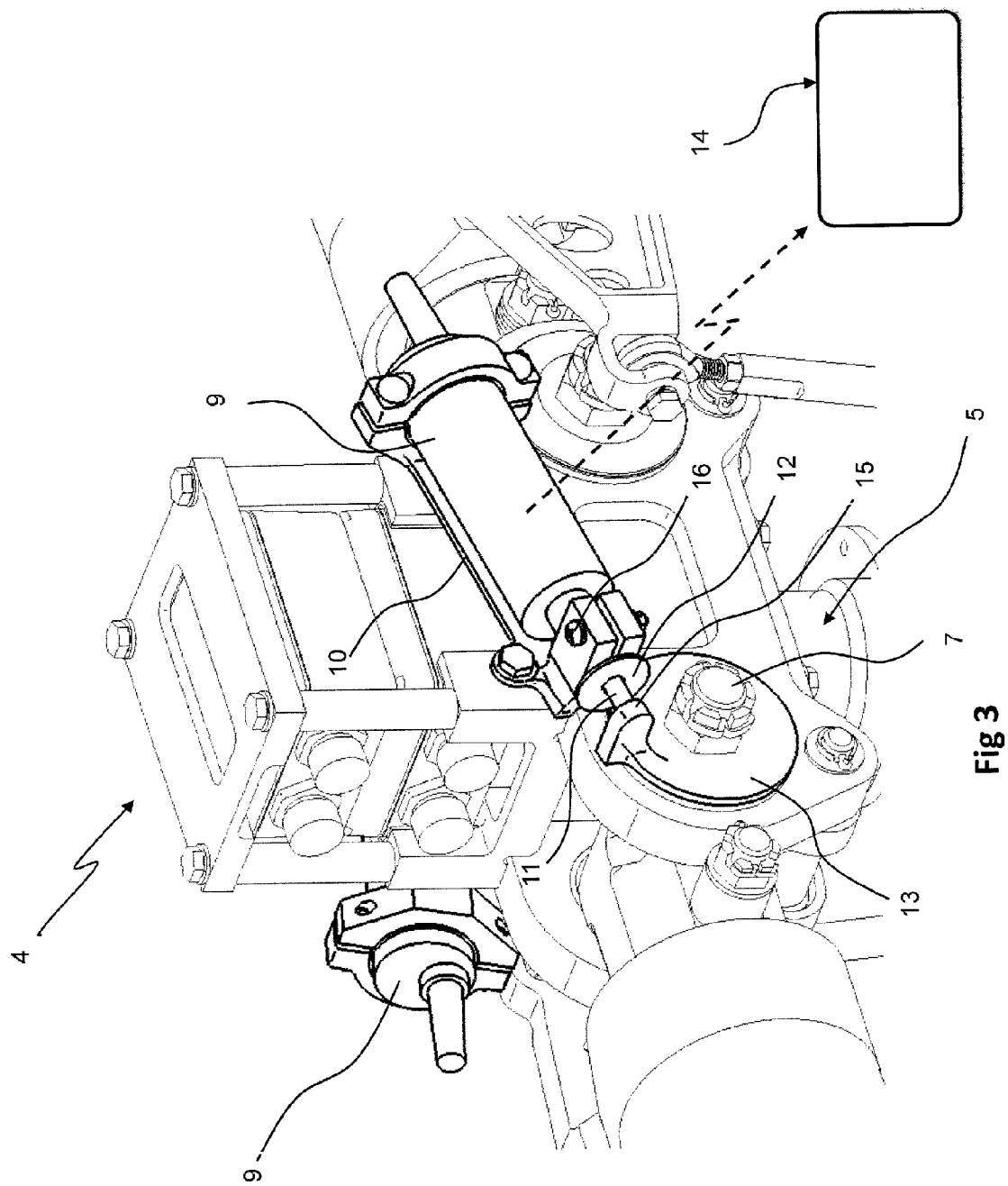
FIG. 3 illustrates more in detail, and in a perspective view, a sensor arrangement for monitoring the angle of the rotor blades, in relation to the rotor head/hub and rotor shaft.

By help of these sensors 9 it is possible to continuously measure the actual angel $\alpha$ of the rotor blade in relation to the rotor shaft 5 and it is therefore possible to detect when and how much the two rotor blades are flapping at all times. The rotor blades are expected to flap with about the same frequency as the rotational speed of the rotor shaft FIG. 3 illustrates more in detail the sensors 9 and their installation on the rotor head 4. The sensors 9 are mounted by means of screws and consoles 10. Each sensor 9 is arranged with a central axle 11 that moves longitudinally within the sensor 9. The axle 11 is in contact with the tilting washer 13 via a heel 15 and moves thereby in accordance with the flapping hinge 7 and the tilting washer 13.

The sensor 9, and its axle 11, may be mechanically adjusted in its length position by an adjustment mechanism 12 located in the console 10. The mechanical adjustment is performed by manually rotating the adjustment mechanism 12 which may be provided with a thread and a washer formed element. After the adjustment the sensor 9 is locked in its new position by e.g. a screw 16.

When the flapping hinge 7 moves the tilting washer 13 and its heel 15 acts mechanically on the sensor axle 11 and the sensor 9 generates an electrical signal that is transmitted by wire or wireless to a control/evaluation unit 14. The sensor 9 measure the vertical angular movement of the flapping hinge 7 and the rotor blade during the whole turn of the rotor shaft 5. The control/evaluation unit 14 is arranged to receive the electrical signal and evaluate the signal in order to detect any abnormalities in the normally sine wave formed signal by comparing the actual measured electrical signal to a stored signal or stored value in order to detect if the actual measured signal depart from the predetermined and acceptable values, i.e. if the actual signal is distorted in any way, indicating that the flapping hinge 7 or the rotor blade is malfunctioning and/or needs maintenance.

The above description is primarily intended to facilitate the understanding of the invention. The invention is of course not limited to the above embodiments but also other variants of the invention are possible and conceivable within the scope of the invention and the appended claims. And the invention is of course possible to use in other applications not mentioned here.

The invention claimed is:

1. A system for monitoring movements in rotor blades attached by flapping hinges to a central head or hub of a helicopter, the system comprising:
   at least one sensor including a sensor axle and installed on the central head or hub,
   a tilting washer in contact with the sensor axle of the at least one sensor, and
   a flapping hinge with which the tilting washer rotates,
   wherein the at least one sensor is arranged to continuously measure a vertical angular movement of the flapping hinge.

2. The system according to claim 1, wherein the at least one sensor is configured to generate an electrical signal.

3. The system according to claim 2, further comprising:
   a control/evaluation unit configured to receive the electrical signal and evaluate the electrical signal for any abnormalities.

4. The system according to claim 3, wherein the control/evaluation unit is configured to compare an actual measured electrical signal to a stored signal or value in order to detect if the actual measured signal depart from predetermined and acceptable values, to determine if the actual signal is distorted in any way, indicating that the flapping hinge is malfunctioning and/or needs maintenance.

5. The system according to claim 1, wherein the sensor is a linear sensor.

6. The system according to claim 5, wherein the sensor is a linear position transducer.

7. The system according to claim 1, wherein the sensor is configured to measure the vertical angular movement of a rotor blade or flapping hinge during a whole turn of the rotor shaft.

8. The system according to claim 1, wherein the at least one sensor generates a signal comprising a sine wave formed signal.

9. A method for monitoring movements in rotor blades attached by flapping hinges to a central head or hub of a helicopter, the method comprising:
continuously measuring with a sensor a vertical angular movement of the flapping hinge, wherein the sensor includes a sensor axle and is installed on the central head or hub, and wherein the sensor axle of the sensor is in contact with a tilting washer that rotates with a corresponding flapping hinge.

10. The method according to claim 9, further comprising:
continuously generating an electrical signal responsive of the angular movement of at least one of a rotor blade or the flapping hinge.

11. The method according to claim 10, further comprising:
evaluating the electrical signal to detect any abnormalities in the mechanical functioning.

12. The method according to claim 9, further comprising:
comparing an actual measured electrical signal to a stored signal or value in order to detect if the actual measured signal depart from predetermined and acceptable signals/values, to determine if the actual signal is distorted in any way, indicating that the flapping hinge is malfunctioning and/or needs maintenance.

* * * * *